(12) United States Patent
Hopka et al.

(10) Patent No.: US 9,534,524 B1
(45) Date of Patent: Jan. 3, 2017

(54) DUAL RATE DIESEL PARTICULATE FILTER LEAK MONITOR

(71) Applicant: Ford Global Technologies, LLC, Dearborn, MI (US)

(72) Inventors: Michael Brendan Hopka, Milford, MI (US); William Russell Goodwin, Farmington Hills, MI (US); Michiel J. Van Nieuwstadt, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 35 days.

(21) Appl. No.: 14/743,606

(22) Filed: Jun. 18, 2015

(51) Int. Cl.
| F01N 11/00 | (2006.01) |
| F01N 3/025 | (2006.01) |
| F02D 41/30 | (2006.01) |
| F02D 41/00 | (2006.01) |
| F01N 9/00 | (2006.01) |
| F01N 3/023 | (2006.01) |
| F01N 3/021 | (2006.01) |
| B01D 46/00 | (2006.01) |
| F02D 41/14 | (2006.01) |
| F02D 41/22 | (2006.01) |

(52) U.S. Cl.
CPC .............. *F01N 3/025* (2013.01); *F01N 11/00* (2013.01); *F02D 41/0002* (2013.01); *F02D 41/30* (2013.01); *B01D 46/0086* (2013.01); *F01N 3/021* (2013.01); *F01N 3/023* (2013.01); *F01N 9/002* (2013.01); *F01N 2430/00* (2013.01); *F01N 2550/04* (2013.01); *F01N 2560/05* (2013.01); *F01N 2560/20* (2013.01); *F01N 2900/0416* (2013.01); *F01N 2900/0418* (2013.01); *F01N 2900/0421* (2013.01); *F01N 2900/0422* (2013.01); *F01N 2900/1606* (2013.01); *F02D 41/1494* (2013.01); *F02D 2041/227* (2013.01); *F02D 2041/228* (2013.01); *F02D 2200/0812* (2013.01); *Y02T 10/47* (2013.01); *Y02T 10/54* (2013.01)

(58) Field of Classification Search
CPC ...... B01D 46/0086; F01N 3/021; F01N 3/023; F01N 9/002; F01N 11/00; F01N 2430/00; F01N 2550/04; F01N 2560/05; F01N 2560/20; F01N 2900/0416; F01N 2900/0418; F01N 2900/0421; F01N 2900/0422; F01N 2900/1606; F02D 2041/227; F02D 2041/228; F02D 41/1494; F02D 2200/0812; Y02T 10/47; Y02T 10/54
USPC . 60/274, 276, 277, 285, 286, 295, 297, 303, 60/311, 320
See application file for complete search history.

(56) References Cited

U.S. PATENT DOCUMENTS

| 8,561,388 B2 | 10/2013 | Yahata et al. | |
| 8,656,763 B2 | 2/2014 | Yoshioka | |
| 2012/0011829 A1* | 1/2012 | Taibi | F01N 3/103 60/274 |
| 2012/0125081 A1* | 5/2012 | Yadav | F01N 11/00 73/23.33 |
| 2014/0150406 A1* | 6/2014 | Goodwin | F01N 11/00 60/274 |
| 2016/0238508 A1* | 8/2016 | Bovi | F01N 9/005 |

\* cited by examiner

*Primary Examiner* — Jorge Leon, Jr.
(74) *Attorney, Agent, or Firm* — Julia Voutyras; Alleman Hall McCoy Russell & Tuttle LLP

(57) ABSTRACT

Methods and systems are provided for detecting leaks in a diesel particulate filter (DPF). In one example, a faster leak detection routine may be performed during a single drive cycle to detect large leaks in the DPF. However, if there are no large leaks in the DPF, a slower leak detection may be performed over a plurality of drive cycles, to detected smaller leaks in the DPF.

16 Claims, 6 Drawing Sheets

DUAL RATE DIESEL PARTICULATE FILTER LEAK MONITOR

FIELD

The present description relates generally to methods and systems for monitoring particulate filter leaks.

BACKGROUND/SUMMARY

Diesel combustion exhaust is a regulated emission. Various technologies have been developed for identifying and filtering out exhaust particulate matter (PM) before the exhaust is released to the atmosphere. Diesel particulate filters (DPF) are commonly used for particulate matter (PM) or soot control. The DPF may reduce the amount of PM emissions by trapping (or filtering) the PMs or soot in the exhaust. A particulate matter (PM) sensor located downstream of the DPF in the exhaust passage monitors the filtration efficiency of the DPF and is typically used for detecting leaks in the DPF.

The PM sensor operates by collecting exhaust particulates on a pair of metal electrodes separated by an insulating gap. When the PM sensor is exposed to particulates, the gap is bridged by electrically conductive material, yielding a change in resistance that is observed as an increase in current measured across the PM sensor electrodes. The time required for the current to rise to a threshold level depends on the amount of particulate matter to which the sensor is exposed (degree of leak in the DPF) and the design of the sensor.

One example approach to detect leaks in the DPF is shown by Yahata et. al. in U.S. Pat. No. 8,561,388. Therein, an estimating unit estimates a failure-state energization timing which determines the PM sensor current (or energization) assuming that the particulate filter has failed. Furthermore, a determining unit determines that the particulate filter is in a failure state when an actual energization timing of the PM sensor based on an output of the PM sensor is earlier than the failure-state energization timing estimated. Thus, by monitoring the energization timing of the PM sensor, the failure state of the DPF is determined.

However, the inventors herein have recognized potential issues with such systems. The leak detection described by Yahata et. al. may have issues particularly when lower DPF leaks are to be detected. As such, the actual energization timing of the PM sensor depends inversely on the leak rate of the DPF. In order to detect smaller leaks in the DPF, the energization timing may be longer than a single drive cycle, for example. However, longer timing is contradictory to OBD regulations which allow for only one drive cycle to complete necessary monitoring.

In one example, part of the issues described above may be addressed by a method comprising: adjusting engine operation in response to a particulate matter (PM) sensor coupled downstream of a particulate filter in an engine exhaust and indicating degradation of a particulate filter in the engine exhaust in response to a PM sensor performance within a single drive cycle and over a plurality of drive cycles. In this way, by monitoring the PM levels over a single drive cycle, larger leaks in the DPF may be detected. However if there are no large leaks in the DPF, the PM levels may be continued to be monitored for a longer duration, during the plurality of drive cycles, to detect smaller leaks in the DPF. In this way, larger and smaller leaks in the DPF may be monitored separately.

As one example, a faster leak detection may include indicating a large leak if the PM sensor current exceeds the threshold current within a single drive cycle. Thus, if the PM sensor current reaches threshold within a single drive cycle, then it may indicate that there is a large leak in the DPF, and appropriate mitigating actions may be initiated. However, if no leak is detected during the single drive cycle, a slower detection may be performed that includes monitoring the PM sensor current over multiple drive cycles. If the PM sensor current reaches threshold during one of the multiple drive cycles, then it may indicate that there is a smaller leak in the DPF, and corresponding mitigating actions may be initiated. However, if the PM sensor current stays below the threshold during all of the multiple drive cycles, then it may indicate that there is no leak in the DPF. In this way, by including separate detection methods for small and large leaks, DPF performance may be evaluated during multiple drive cycles.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
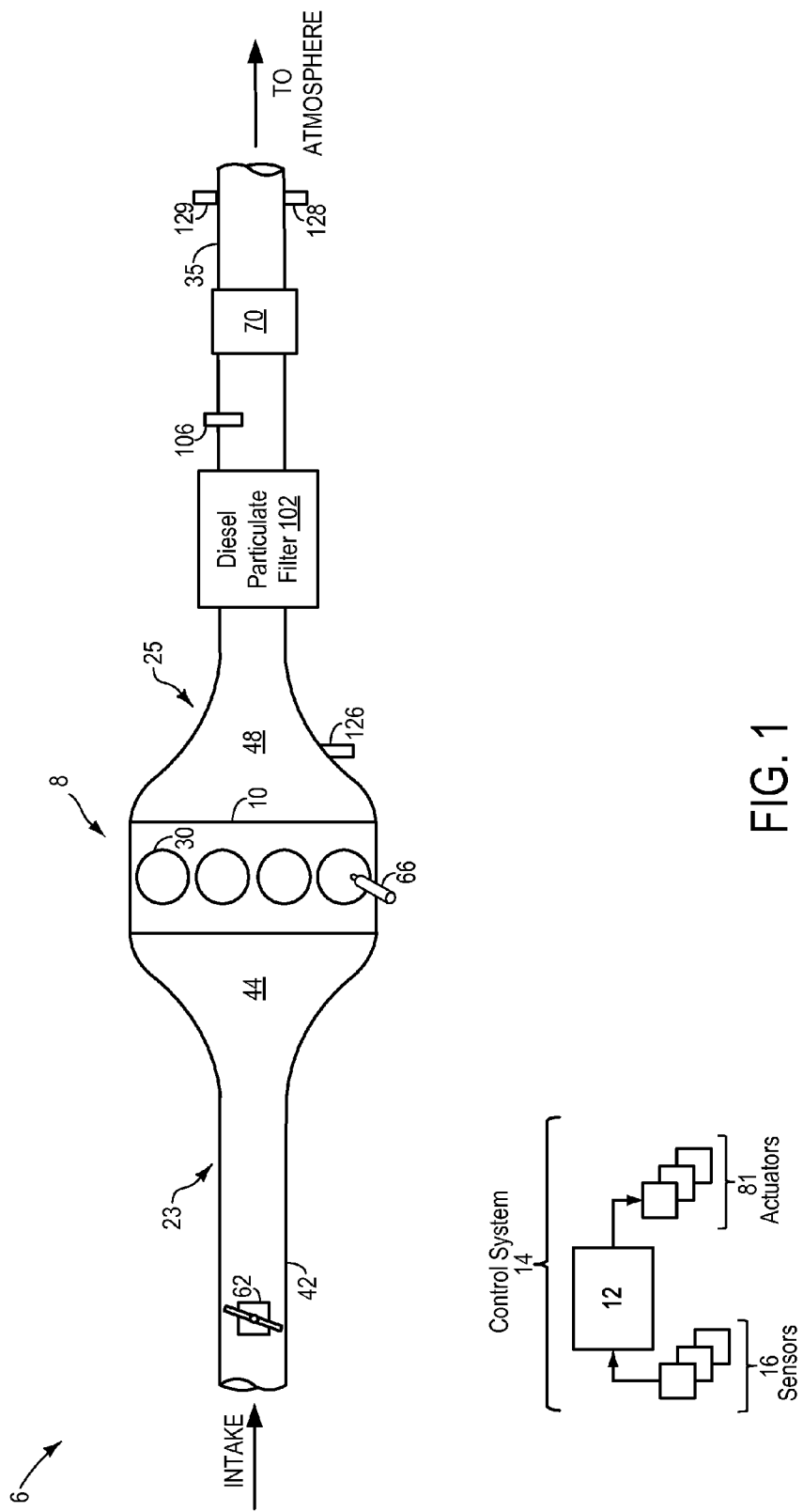
FIG. 1 shows a schematic diagram of an engine and an associated exhaust particulate matter (PM) sensor located downstream of a diesel particulate filter (DPF).
Figure 2:
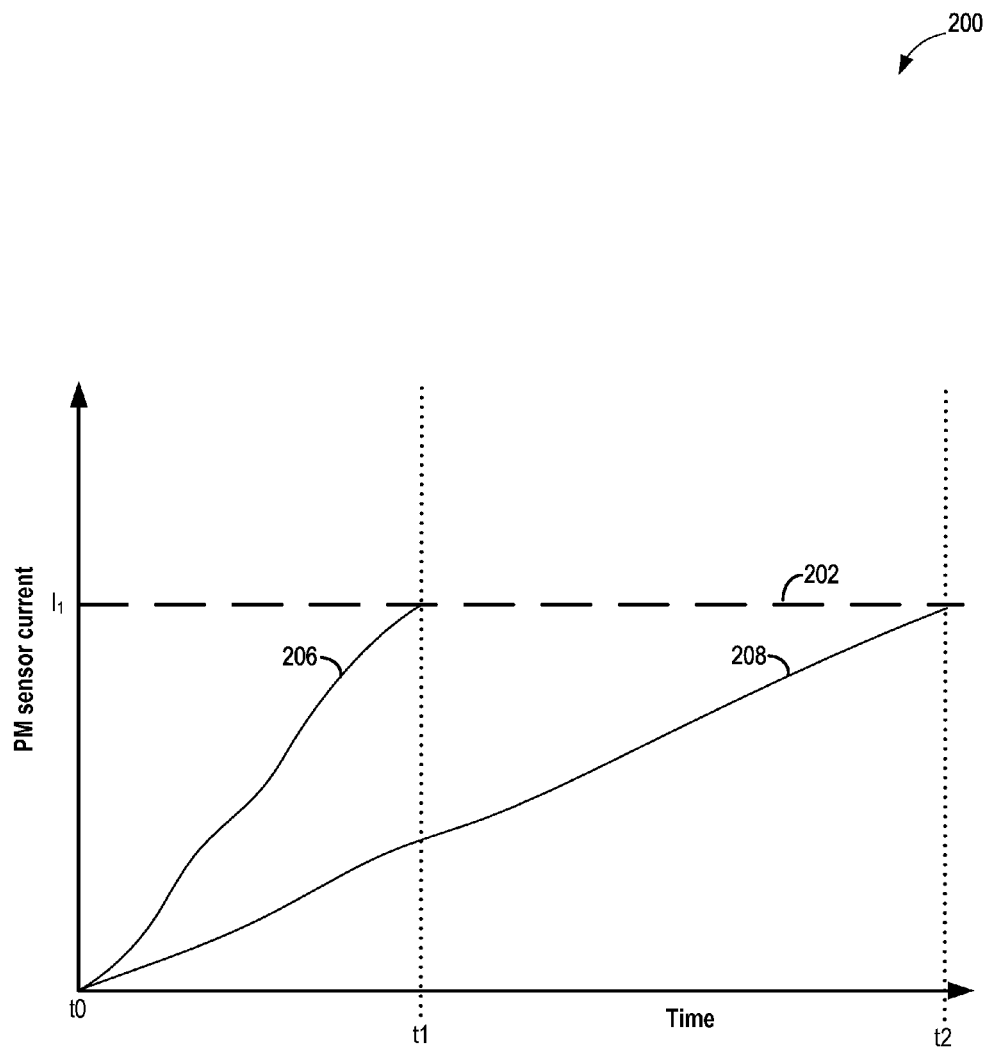
FIG. 2 shows an example relationship between PM sensor current and monitoring time.

The following description relates to systems and methods for detecting leaks in a diesel particulate filter (DPF) based on an output of particulate matter (PM) sensor positioned downstream of the DPF in an engine exhaust line in an engine system, such as in the engine system of FIG. 1. The DPF leak rate may be monitored by monitoring the time at which a PM sensor current reaches a threshold current. However, the DPF leak rate, and hence the time it takes the PM current levels to reach threshold varies inversely with the monitoring time as shown in FIG. 2. Thus, in order to detect lower DPF leak rates, the diagnostic routine may take longer time to complete. A controller may be configured to perform a routine, such as the routine of FIG. 3, to detect large and small leaks in the DPF separately by monitoring the PM sensor current over a plurality of drive cycles. The controller may also be configured to perform a routine, such as routine of FIG. 4, to regenerate the PM sensor when the PM sensor current reaches threshold levels. Furthermore, the controller may be configured to perform a routine, such as routine of FIG. 5, to regenerate the DPF when the PM or soot load of the DPF reaches threshold levels. An example relationship between PM sensor current during large and small leaks in the DPF monitored over the plurality of drive cycles is shown in FIG. 6. In this way, both large and small leaks in the DPF may be detected by performing a fast and slow leak detection monitoring and thus, the time requirements for future PM OBD limits may be met.

FIG. 1 shows a schematic depiction of a vehicle system 6. The vehicle system 6 includes an engine system 8. The engine system 8 may include an engine 10 having a plurality of cylinders 30. Engine 10 includes an engine intake 23 and an engine exhaust 25. Engine intake 23 includes a throttle 62 fluidly coupled to the engine intake manifold 44 via an intake passage 42. The engine exhaust 25 includes an exhaust manifold 48 eventually leading to an exhaust passage 35 that routes exhaust gas to the atmosphere. Throttle 62 may be located in intake passage 42 downstream of a boosting device, such as a turbocharger (not shown), and upstream of an after-cooler (not shown). When included, the after-cooler may be configured to reduce the temperature of intake air compressed by the boosting device.

Engine exhaust 25 may include one or more emission control devices 70, which may be mounted in a close-coupled position in the exhaust. One or more emission control devices may include a three-way catalyst, lean NOx filter, SCR catalyst, etc. Engine exhaust 25 may also include diesel particulate filter (DPF) 102, which temporarily filters PMs from entering gases, positioned upstream of emission control device 70. In one example, as depicted, DPF 102 is a diesel particulate matter retaining system. DPF 102 may have a monolith structure made of, for example, cordierite or silicon carbide, with a plurality of channels inside for filtering particulate matter from diesel exhaust gas. Tailpipe exhaust gas that has been filtered of PMs, following passage through DPF 102, may be measured in a PM sensor 106 and further processed in emission control device 70 and expelled to the atmosphere via exhaust passage 35.

The DPF installed on vehicles is typically monitored for leaks per the Environmental Protection Agency (EPA) and California Air Resources Board (CARB) regulations. More stringent detection thresholds stipulated by the regulatory agencies have led to the use of PM sensors to detect filter leaks. The PM sensor 106 typically includes a pair of planar interdigitated electrodes forming a "comb" structure. These electrodes may be typically manufactured from metals such as platinum, gold, osmium, rhodium, iridium, ruthenium, aluminum, titanium, zirconium, and the like, as well as, oxides, cements, alloys and combination comprising at least one of the foregoing metals. The electrodes are formed on a substrate of the PM sensor that is typically manufactured from highly electrically insulating materials. Possible electrically insulating materials may include oxides such as alumina, zirconia, yttria, lanthanum oxide, silica, and combinations comprising at least one of the foregoing, or any like material capable of inhibiting electrical communication and providing physical protection for the pair of interdigitated electrodes. The spacing between the comb "tines" of the two electrodes may typically be in the range from 10 micrometers to 100 micrometers with the linewidth of each individual "tine" being about the same value, although the latter is not necessary.

In the depicted example, PM sensor 106 is a resistive sensor that estimates a soot load of DPF 102 based on a change in conductance measured across the electrodes of the PM sensor. As such the conductance may be determined from the PM sensor current, for example. As soot particles get deposited on the sensor electrodes, the PM sensor current (and hence conductance) begins to increase. The soot load on the PM sensor may be determined based on the PM sensor current levels. If the soot emission from the DPF 102 as determined from the output of the PM sensor 106 is greater than the threshold soot emission, then the DPF 102 may be determined to be leaking and damaged, and in need of replacement. When the PM sensor current reaches a threshold current, the PM sensor may be regenerated by heating the PM sensor until the soot particles are burned off. The response time for the accumulation of soot emission and thus the response time to achieve a threshold of conductance is a measure of DPF leakage.

Figure 3:
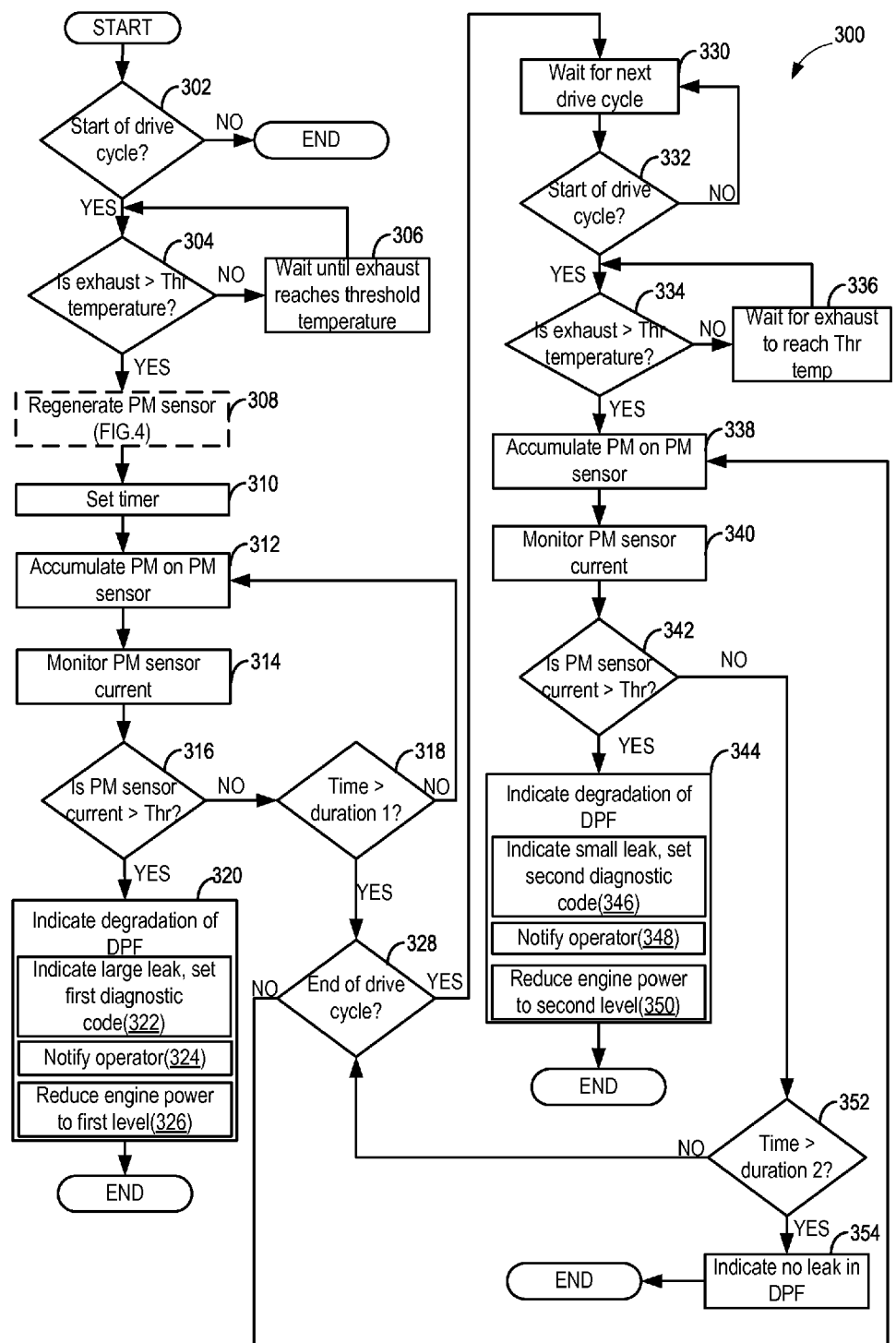
FIG. 3 shows a high level flow chart for detecting large and small leaks in the DPF in a plurality of drive cycles, according to the present disclosure.

The leak rate of the DPF may be monitored by monitoring the time it takes the PM sensor current to reach a threshold, for example. Turning now to FIG. 2, plot 200 shows an example relationship between PM sensor current threshold and monitoring time. The PM sensor current is shown at plot 206 and the PM sensor current threshold ($I_1$) is shown at plot 202. For example, the DPF leak rate is based on the time taken for the PM sensor current to reach threshold $I_1$. In plot 200, the PM sensor current reaches threshold $I_1$ at time t1. The leak rate of the DPF may be given by the slope of plot 206 (e.g., ~$I_1$/t1). More stringent EPA and CARB regulations stipulate even lower DPF leak rates to be detected. Consider the PM sensor current shown at plot 208, for example. The PM sensor current (plot 208) reaches threshold $I_1$ at time t2. The leak rate of the DPF is given by the slope of plot 208 (~$I_1$/t2). Thus, slope of plot 208 is lower than the slope of plot 206, indicating the DPF leak rate is lower. In order to detect lower DPF leak rates, longer monitoring times (t2) are required, as shown in plot 200 (compare times t1 and t2). However, the leak detection is typically expected to complete within a short time, as short as a single drive cycle wherein the drive cycle includes a vehicle-on and a vehicle-off with an engine-on in between, for example. Specifically, for slower DPF leaks, it may not be possible to complete the detection within a single drive cycle. In order to meet the completion time requirement, a dual rate DPF leak monitor may be used. As such, by using a separate monitoring method for detecting larger and smaller leaks as shown in FIG. 3, the larger leaks may be detected faster, within a single drive cycle, for example. In this way, long measurement times for decreasing DPF leak rates may be avoided and the completion time requirements for PM OBD limits may be met.

Returning to FIG. 1, the vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 (located in exhaust manifold 48), temperature sensor 128, pressure sensor 129 (located downstream of emission control device 70), and PM sensor 106. Other sensors such as additional pressure, temperature, air/fuel ratio, and composition sensors may be coupled to various locations in the vehicle system 6. As another example, the actuators may include fuel injectors 66, throttle 62, DPF valves that control filter regeneration (not shown), etc. The control system 14 may include a controller 12. The controller 12 may be configured with computer readable instructions stored on non-transitory memory. The controller may receive input data from the various sensors, process the input data, and trigger the actuators in response to the processed input data based on instruction or code programmed therein corresponding to one or more routines. Example routines are described herein with reference to FIGS. 3, 4 and 5.

Instructions for carrying out method 300 and the rest of the methods (400 and 500) included herein may be executed by the controller 12 based on instructions stored on a memory of the controller and in conjunction with signals received from sensors of the engine system, such as the sensors described above with reference to FIG. 1. The controller may employ engine actuators of the engine system to adjust engine operation, according to the methods described below.

Turning now to FIG. 3, a method 300 for detecting larger and smaller leaks in the DPF during a plurality of drive cycles is shown. Specifically, the routine includes a faster detection of larger DPF leaks and a slower detection of smaller leaks in the DPF.

At 302, it may be determined if it is the start of a drive cycle. For example, the drive cycle may include a single sequence of a vehicle-on, an engine-run and a vehicle-off. For example, turning ON an ignition key may indicate the vehicle-on condition, and turning OFF the ignition key may indicate the vehicle-off condition. In other examples, pressing a start/stop button to start the engine may indicate the vehicle-on condition, and pressing the start/stop button to turn off the engine may indicate the vehicle-off conditions. In vehicles equipped with radio-frequency identification (RFID) key fobs, pressing or pushing a button to start/stop the engine may indicate vehicle on/off conditions. Furthermore, the single drive cycle may include an engine-run between the vehicle-on and vehicle-off. In some examples, the engine-run may include the engine operating for a threshold time or the vehicle driving for a threshold distance. Hence a single drive cycle encompasses vehicle-on, followed by engine-run, and a subsequent vehicle-off. Specifically, during the single drive cycle, the vehicle is operated without any other ON/OFF cycles in between. If it is not the start of the drive cycle, then method ends.

However if start of drive cycle is indicated, then method proceeds to 304. At 304, it may be determined if the exhaust temperature is greater than a threshold temperature, Thr. In one example, the threshold may be the dew point temperature. Typical dew point temperatures are in the range between 45-55° C. depending on the air-fuel ratio. In particular, when exhaust temperature is higher than the dew point temperature, for example, water condensate will not form in the exhaust. Therefore, PM sensors and sensor heaters may be activated only when the exhaust temperature exceeds the dew point temperature at the particular sensor location in the exhaust system. If the exhaust temperature is not greater than Thr, then method proceeds to 306, where the method includes instructions to wait until exhaust temperature reaches Thr. Once the exhaust temperature is above Thr, then method proceeds to 308 where the PM sensor may be regenerated. Herein, the PM sensor may be regenerated if the PM sensor current measured in a preceding drive cycle (as retrieved from memory by the controller, for example) is higher than a threshold current for regeneration, for example. However, if the PM sensor current has not reached the threshold current for regeneration in the previous drive cycle or if this is the first drive cycle since regenerating the PM sensor, then method may skip 308 and proceed to 310, where a timer is set. Next, the method proceeds to 312, where PMs are accumulated on the PM sensor. As explained earlier, the PM sensor operates by collecting exhaust particulates on a pair of metal electrodes separated by an insulating gap. As the PM sensor accumulates PMs, the gap is bridged by electrically conductive material, yielding a change in resistance that is observed as an increase in current through the electrodes. The PM sensor current is monitored at 314. Next, the method proceeds to 316 where it is determined if the PM sensor current is higher than a threshold, Thr. For example, the threshold Thr may be set to detect large leaks in the DPF (e.g., Thr may be 5 to 50 µA depending on sensor design). As another example, the threshold Thr may be the current level at which the soot load reaches the threshold for regeneration. As such, if the PM sensor current (or soot load) reaches the threshold, it may indicate the PM sensor regeneration conditions are met. If the PM sensor current is greater than the threshold, then method proceeds to 320, where degradation of the DPF is indicated. Indicating degradation of the DPF may further include, indicating a large leak in the DPF, and setting a first diagnostic code at 322. For example, the first diagnostic code may reflect a "catastrophic" failure of the DPF. Further, at 324, an operator may be notified that the DPF is exhibiting large leak and prompted to replace the degraded DPF. Further still, at 326, the engine power may be reduced to a first level or threshold. Reducing the engine power to the first level may reduce the amount of emissions in the exhaust.

Thus, large leaks in the DPF may be detected during single drive cycles, and method 300 ends. Alternatively, once large leak is detected at 316, the method may continue to monitor the PM sensor performance by returning to 302 over plurality of drive cycles. Herein, the plurality of drive cycles may include successive drive cycles with an engine cooled to ambient temperatures in between. In particular, the controller may perform actions described from 302 until 320, while regenerating the PM sensor at 308 (by performing routine 400 of FIG. 4) during each drive cycle. If the PM sensor current continues to reach threshold levels during all of the drive cycles, it may be indicated that there is large leak in the DPF, and the operator may be notified to take immediate mitigating actions to replace the leaky DPF as explained at 320.

Returning to 316, if the PM sensor current stays below threshold when checked at 316, method proceeds to 318 where it may be determined if a threshold duration (duration 1) has elapsed. For example, the threshold duration may correspond to a stipulated monitor completion time. As an example, the monitor completion time may be a preset duration (say, 800 seconds, for example).

If threshold duration has not elapsed, then method continues to accumulate PMs on the PM sensor as described at 312. In addition, actions described from 312 to 316 are performed until the threshold duration has elapsed. However, if the threshold duration has elapsed when checked at 318, method proceeds to 328, where it may be determined if it is the end of the drive cycle. As such, end of drive cycle may also be referred to as vehicle-off condition. For example, turning off the ignition key may indicate the end of the drive cycles. Alternatively, pressing the start/stop button to stop the engine may indicate the end of the drive cycle. In vehicles equipped with RFID key fobs, pressing the button to stop the engine may indicate end of drive cycle.

If end of the drive cycle is not indicated, then method proceeds to 338 where the PMs are accumulated on the PM sensor electrodes, and continues onto 340 where the PM sensor current is monitored as described below. However, if end of drive cycle is detected when checked at 328, method proceeds to 330, where the method includes waiting until the next drive cycle. Next, at 332 method includes determining if the start of the next drive cycle is indicated. As described earlier, the start of the drive cycle, also referred to vehicle-on condition, may be initiated by performing any of the following: turning ON the ignition key, pressing the start button to start the vehicle, and pressing a start button on the RFID key fob. If start of the drive cycle is not indicated, then method continues to wait for the next drive cycle. When the next drive cycle is indicated, then method proceeds to 334, where it is checked if the exhaust temperature is above the threshold temperature, as described earlier. For example, the threshold temperature may be the dew point temperature. If the exhaust temperature has not reached the threshold temperature, method includes waiting until the exhaust temperature reaches the threshold temperature at 336, as explained earlier. Once the exhaust temperature reaches the threshold temperature, method proceeds to 338. At 338, method includes operating the PM sensor to accumulate PMs on the sensor electrodes as explained earlier. Next, at 340 the PM sensor performance, including the PM sensor current may be monitored. The method then proceeds to 342, where it is checked if the PM sensor is greater than the threshold, Thr. As explained earlier, the threshold Thr, may be a preset PM sensor current level to detect leaks in the DPF, or alternatively represent the current level at which the sensor load reaches the threshold for regeneration, for example. If the PM sensor current is greater than Thr, then method proceeds to 344 where a degradation of the DPF is indicated. Indicating degradation of the DPF further includes, indicating a smaller leak in the DPF, and setting a second diagnostic code at 346. For example, the second diagnostic code may be different from the first diagnostic code. Further, at 348, the operator may be notified that the DPF is exhibiting a smaller leak and prompted to take mitigation actions. Further still, at 350, the engine power may be reduced to a second threshold or level, and method ends. In this way, smaller leaks in the DPF may be detected over multiple drive cycles.

However, if the PM sensor current continues to stay below the threshold level when checked at 342, then method proceeds to 352, where it is determined if the time is greater than a second duration, where the second duration is greater than the first duration. For example, the first duration may be 800 seconds, and the second duration may be 2000 seconds. If the time is greater than the second duration, then method proceeds to 354, where it is indicated that the DPF is leak free and the method ends. However, if the second duration has not elapsed, then method returns to 328 where it may determine if the drive cycle has ended and the action described earlier may be performed until the end of the drive cycle. However, if it is not the end of the drive cycle, then method returns to 338 where the PMs are accumulated on the PM sensor electrodes, and continues onto 340 where the PM sensor current is monitored. The method may continue to check the PM sensor current as described earlier, and actions described from 342 onwards may be performed as described earlier.

Thus, the routine for detecting smaller leaks in the DPF is a slower detection routine that is executed in the event that PMs are not detected on the PM sensor in the start of the drive cycle. The slower leak detection may be required if the large leak test finishes and detects no leak. The time required for the slower leak detection routine is dictated by the time required for the PM sensor to accumulate PMs to the threshold current for a DPF leaking at the OBD threshold. Unlike the faster leak test for detecting large leaks, the duration for the slower leak detection may span multiple drive cycles, in which case the PMs left on the PM sensor from a previous drive would be cleaned off by regenerating in the subsequent drives.

Thus, an example method for a vehicle is provided, the method includes adjusting engine operation in response to a particulate matter (PM) sensor coupled downstream of a particulate filter in an engine exhaust and indicating degradation of a particulate filter in the engine exhaust in response to a PM sensor performance within a single drive cycle and over a plurality of drive cycles. In this way, large and small leaks in the DPF may be monitored separately. In such an example, the drive cycle may include a single sequence of a vehicle-on, an engine-run and a vehicle-off and the plurality of drive cycles may include successive drive cycles with one or more of an engine cooled to ambient temperatures there between and a threshold time elapsed there between. In such an example, monitoring PM sensor performance may additionally or alternatively include monitoring a PM sensor current and indicating degradation may further include indicating a larger leak in the particulate filter when the PM sensor current rises above a current threshold during each of the single drive cycle and the plurality of drive cycles and reducing engine power to a first level. Herein, indicating degradation may further include indicating a smaller leak in the particulate filter when the PM sensor current stays below the current threshold for the single drive cycle, and rises above the current threshold during one of the plurality of drive cycles and further includes reducing the engine power to a second level. In addition, the method may further include indicating no leak in the particulate filter when the PM sensor current stays below the current threshold over each of the single drive cycle and the plurality of drive cycles. Furthermore, adjusting engine operation further includes regenerating the PM sensor when the PM sensor current rises above the current threshold.

Figure 4:
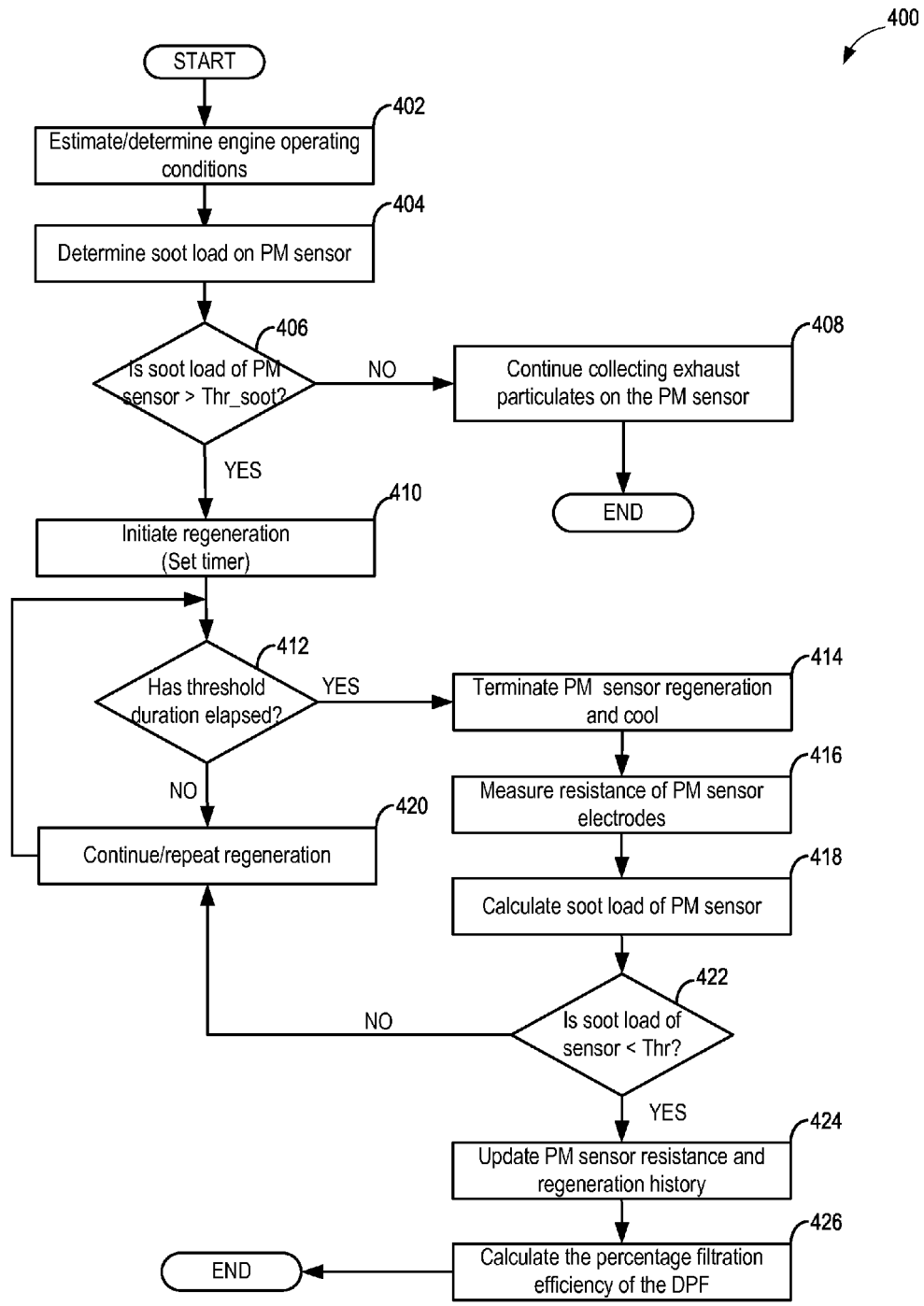
FIG. 4 shows a high level flow chart depicting a method for performing regeneration of the PM sensor.

Turning now to FIG. 4, a method 400 for regenerating the PM sensor (such as a PM sensor 106 shown at FIG. 1, for example) is shown. Specifically, the routine uses a resistance-based sensor regeneration process of the PM sensor to calculate the percentage filtration efficiency of the DPF via a coupled processor.

At 402 the engine operating conditions may be estimated. Engine operating conditions determined may include, for example, engine speed, engine temperature, various exhaust air-fuel ratios, various exhaust temperatures, PM sensor current, soot load on PM sensor, soot load on DPF, ambient temperature, duration (or distance) elapsed since a last regeneration of the DPF, etc. At 402, the PM or soot load on the PM sensor may be determined. The soot load of the PM sensor may be determined based on a resistance or current measured across the PM sensor electrodes for example. At 406, it may be determined if the soot load on the PM sensor is greater than a threshold load of soot, Thr_soot. As the soot load on the PM sensor increases, the PM sensor current increases. When the soot load on the sensor is greater than the threshold, or when the PM sensor current rises to a threshold current, the PM sensor may need to be regenerated to enable further soot detection. If the PM sensor load is higher than the threshold, then method 400 proceeds to 410, where regeneration of the PM sensor may be initiated and the PM sensor may be regenerated by heating up the sensor. The engine controller may have stored instructions to send a regeneration signal to the regeneration circuit responsive to the soot level data. The PM sensor may be heated by actuating a heating element coupled thermally to the sensor electrode surface, such as a heating element embedded in the sensor, until the soot load of the sensor has been sufficiently reduced by oxidation of the carbon particles between the electrodes. The PM sensor regeneration is typically controlled by using timers and the timer may be set for a threshold duration at 410. Alternatively, the sensor regeneration may be controlled using a temperature measurement of the sensor tip, or by the control of power to the heater, or any or all of these. When timer is used for PM sensor regeneration, then method 400 includes checking if the threshold duration has elapsed at 412. If the threshold duration has not elapsed, then method 400 proceeds to 420 where the PM sensor regeneration may be continued. If threshold duration has elapsed, then method 400 proceeds to 414 where the PM sensor regeneration may be terminated. Further, the sensor electrodes may be cooled to the exhaust temperature for example. Method 400 proceeds to 416 where the resistance (or current) between the electrodes of the PM sensor is measured. From the measured resistance, possibly compensated for temperature, the soot load of the PM sensor (i.e., the accumulated soot between the electrodes of the PM sensor) may be calculated at 418 and the method proceeds to 422. At 422, the calculated soot load of the PM sensor may be compared with a threshold, Thr. The threshold Thr, may be a lower threshold, lower than Thr_soot, indicating that the electrodes are sufficiently clean of soot particles. In one example, the threshold may be a threshold below which regeneration may be terminated. If the soot load continues to be greater than Thr, indicating that further regeneration may be required, method 400 proceeds to 420 where PM sensor regeneration may be repeated. However, if the PM sensor continues to undergo repeated regenerations, the controller may set error codes to indicate that the PM sensor may be degraded or the heating element in the PM sensor may be degraded. If the soot load is lower than the threshold Thr, indicating that the electrode surface is clean, method 400 proceeds to 424, where the PM sensor resistance/current and regeneration history may be updated and stored in memory. For example, a frequency of PM sensor regeneration and/or an average duration between sensor regenerations may be updated. At 426, various models may then be used by the controller to calculate the percentage efficiency of the DPF filtration of soot. In this way, the PM sensor may perform on-board diagnosis of the DPF.

The engine exhaust passage may include one or more PM and pressure sensors positioned upstream and/or downstream of the DPF for determining a soot load of the DPF. If the soot load on the DPF is greater than a threshold for DPF regeneration, then the controller may adjust engine operating parameters to regenerate the DPF as shown in FIG. 5.

Figure 5:
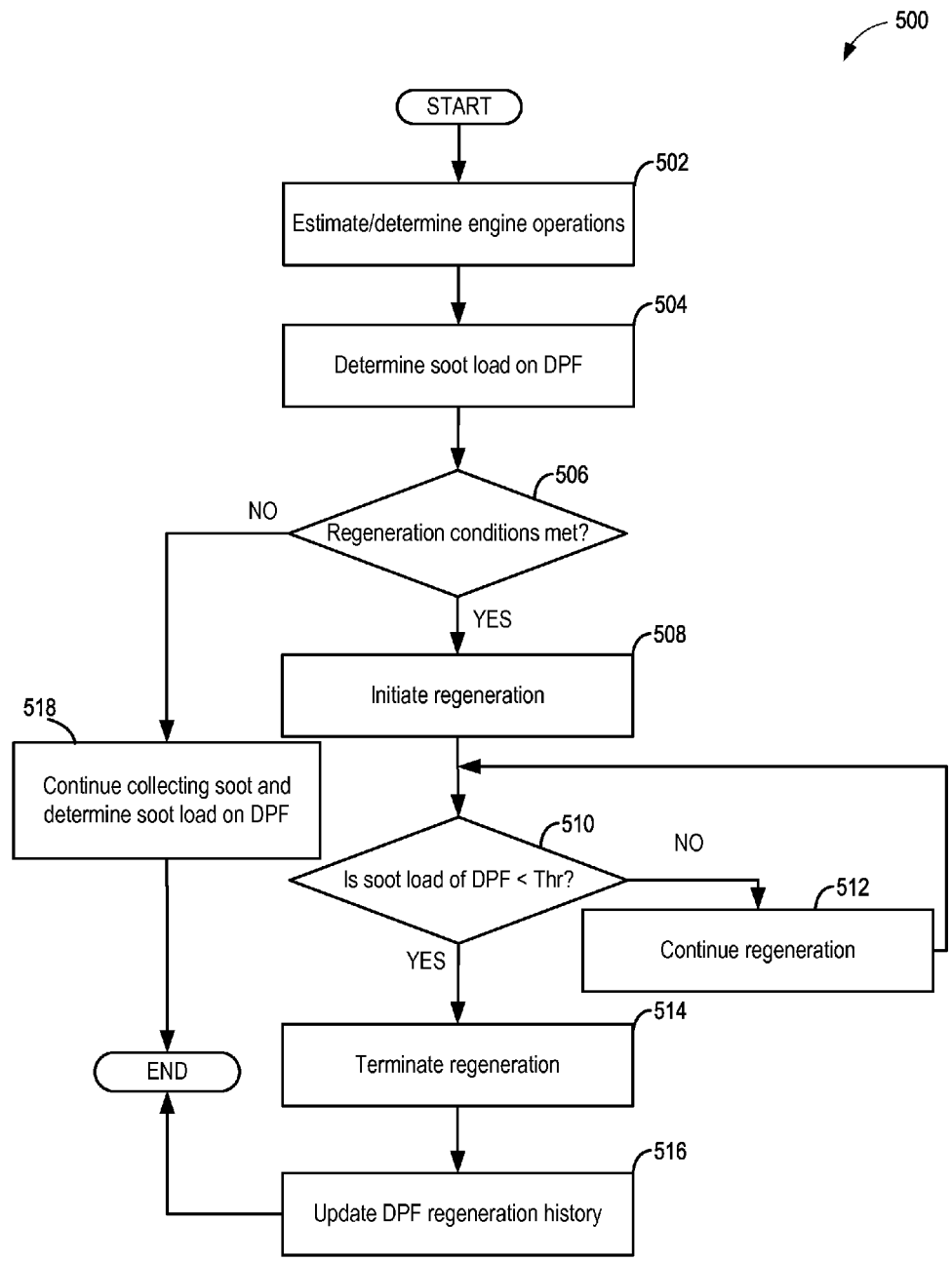
FIG. 5 shows a high level flow chart depicting a method for performing regeneration of the DPF.
Figure 6:
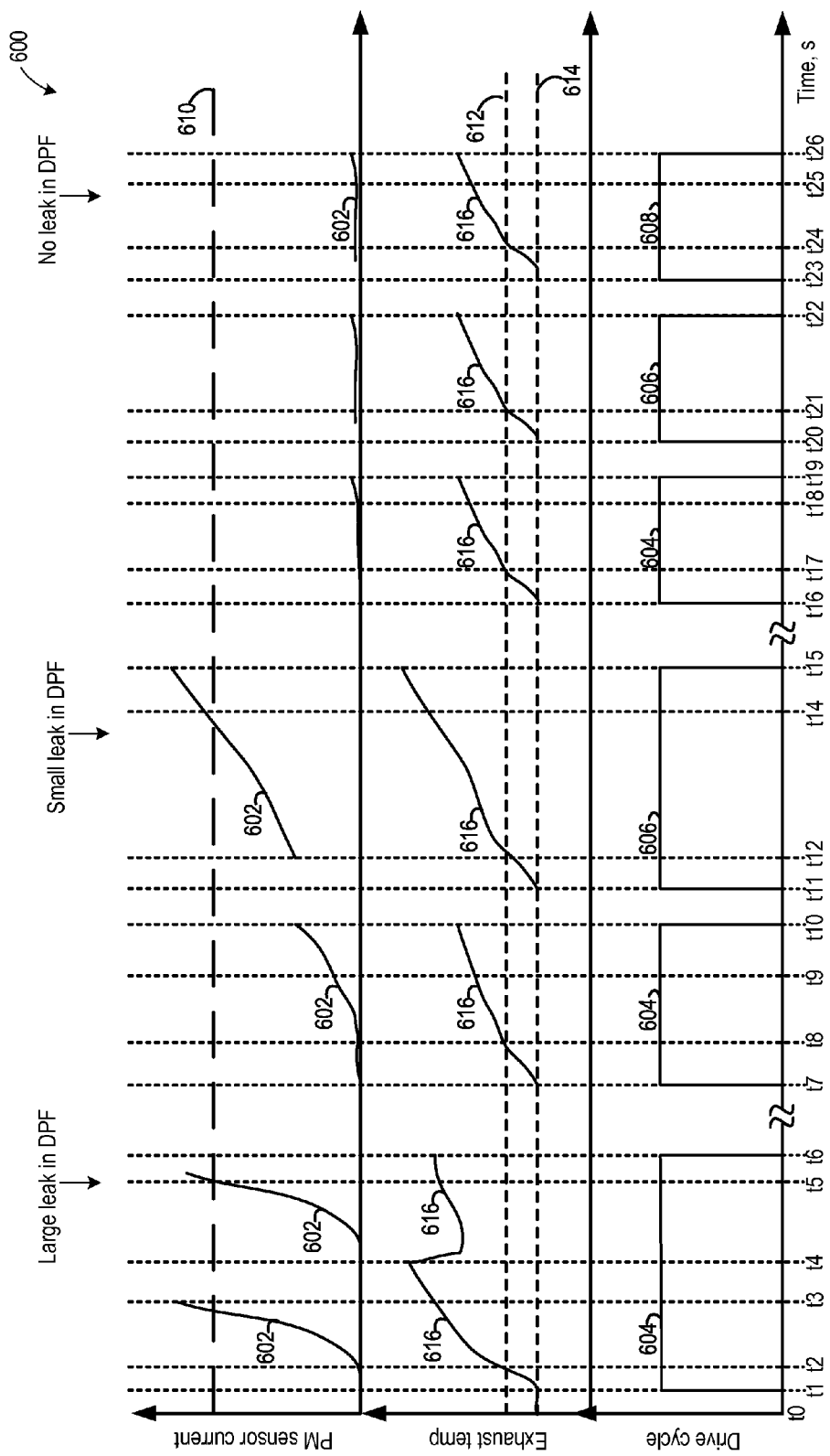
FIG. 6 shows example PM sensor currents during single and plurality of drive cycles, during conditions of large, small, and no leaks in the DPF.

FIG. 5 shows a high level flow chart depicting a method for performing regeneration of an exhaust DPF. Specifically, the routine uses one or more of a pressure sensor or a PM sensor to update a soot load of the DPF and schedule regeneration of the DPF via a coupled processor.

At 502, the routine includes estimating and/or measuring engine operating conditions. Engine operating conditions determined may include, for example, engine speed, engine temperature, exhaust air-fuel ratio, exhaust temperature, duration (or distance) elapsed since a last regeneration of the DPF, boost level, ambient conditions such as barometric pressure and ambient temperature, etc.

The engine exhaust passage may include one or more pressure and PM sensors positioned upstream and/or downstream of the DPF for determining a soot load of the DPF. For example, the engine may include a pair of pressure sensors across the DPF wherein the soot load is estimated based on the pressure difference across the DPF. In another example, the exhaust passage may include a pressure-based sensor upstream of the DPF to determine the soot load on the DPF and a resistivity based PM sensor downstream of the DPF to monitor the functioning of the DPF. The output of the pressure sensor decreases with increasing soot load and may be used to infer the soot load on the DPF. Alternately, the engine may include a resistance-based PM sensor to monitor the soot load of the DPF wherein the resistance-based sensor is positioned upstream of the DPF filter. It may also be possible to use a combination of the pressure sensor and resistance-based PM sensor to determine the soot load of the DPF and diagnose the functioning of the DPF and detect degradation of the DPF (e.g., determine if the DPF is damaged or leaking), as discussed below.

At 504, the soot load on the DPF may be determined based on the output of one or more of an exhaust pressure sensor and an exhaust PM sensor. At 506, it may be determined whether filter regeneration conditions are met, for example, it may be determined whether the soot load on the DPF has reached or exceeded a threshold for regeneration. In one example, the regeneration threshold is an upper threshold above which regeneration is initiated. If no, then at 518, the engine may continue non-regeneration engine operation and may continue to collect soot and determine soot load on the DPF. If yes, then at 508 the system may adjust engine operating parameters to regenerate the DPF. The engine controller may have stored instructions to send a regeneration signal to the regeneration circuit responsive to the soot level data. Specifically, responsive to filter regeneration conditions being met, a temperature of the filter (or in the vicinity of the filter) may be sufficiently raised to burn off stored soot. This may include operating a heater coupled to the DPF, or raising a temperature of engine exhaust (e.g., by operating rich) flowed into the DPF.

After regenerating the DPF, at 510, it may be determined whether the soot load is lower than a threshold. In one example, the threshold is a lower threshold below which regeneration is terminated. If the soot load of the filter is not sufficiently low, DPF regeneration may be continued at 512. However, if the soot load is lower than the threshold, then method proceeds to 514, where the DPF regeneration process may be terminated. This includes discontinuing heating the filter. Next, at 516, the DPF regeneration history may be updated. For example, a duration elapsed between the current regeneration routine and the immediately previous regeneration routine may be determined.

Turning now to FIG. 6, map 600 shows an example relationship between PM sensor current measured over a plurality of drive cycles. Plot 602 shows the PM sensor current measured over a plurality of drive cycles, and plot 610 shows the current threshold of the PM sensor. Plot 604 indicates a single drive cycle, and plots 606 and 608 indicate multiple drive cycles. Plot 616 shows the exhaust temperature. Plot 614 shows the ambient temperature, and plot 612 shows a threshold temperature. For each plot, time is depicted along the x (horizontal) axis while values of each respective parameter are depicted along the y (vertical) axis.

The time between t1 and t6 indicates a single drive cycle. Herein, at t1, a start of the drive cycle may be indicated. The start of the drive cycle may include one or more of an ignition key turning ON, pressing a start button, and pressing a button on a RFID key fob to turn ON the engine. At t1, a timer may be started. At t1, during the start of the drive cycle, the exhaust temperature as measured by an exhaust temperature sensor is at ambient temperature, as shown at plot 616. During this time, the PM sensor is not operated, hence the PM sensor current does not measure any current (plot 602). However, at t2, the exhaust temperature rises above threshold 612, and the PM sensor may be operated to accumulate PMs. As such, the threshold may be the dew point temperature. For example, if the ambient temperature is at or higher than the dew point, then the PM sensor may begin accumulating PMs as soon as the drive cycle is started. As PMs get accumulated on the PM sensor electrodes, the PM sensor current begins to increase (plot 602). However, at t3, the PM sensor current reaches a threshold (plot 610). Herein, the threshold (plot 610) may be preset to detect large leaks in the DPF. Alternatively, the threshold may be the threshold at which PM sensor is regenerated. At t3, the DPF may be regenerated (since a threshold time has elapsed since last DPF regeneration, for example), to burn off the stored PMs. The PM sensor may also be regenerated when the DPF is being regenerated. Specifically, the engine exhaust temperature may be raised (plot 616) between t3 and t4 to burn off the accumulated soot. Once regeneration is completed, the PM sensor may continue to accumulate PMs and the PM sensor current may be monitored between t4 and t5. However, t5 indicates the completion of the first duration (as indicated by the timer, for example). At t5, the PM sensor current continues to rise above the threshold 610, indicating a degradation of the DPF. At t5, a first failure mode may be indicated. Further, at t5, a large leak in the DPF may be indicated, and a first diagnostic code may be set. Furthermore, the operator may be notified about the leaky DPF and requested to take mitigating actions and the engine power may be limited to a first level, for example. At time t6, end of the drive cycle may be indicated. Herein, the ignition key may be tuned OFF or the stop button (or RFID key fob button) may be pressed to turn OFF the ignition. In this way, a large leak in the DPF may be detected using a faster detection method within a single drive cycle, for example.

Another leak detection is shown occurring through multiple drive cycles between t7 and t15. Specifically, t7 to t10 represent a single drive cycle (plot 604) and t11 to t15 represent a successive drive cycle (606), with the engine cooled to ambient there between. At t7, the start of the drive cycle (plot 604) is indicated and a timer is set, as explained earlier. The exhaust is at ambient temperature as indicated by plot 616. Between t7 and t8, the exhaust temperature continues to be below the threshold (612), and the PM sensor does not measure any current (plot 602). However, at t8, the exhaust temperature rises above the threshold, and the PM sensor begins accumulating PMs between its electrodes. This is seen as an increase in PM sensor current (plot 602). At t9 where the first duration has elapsed (as determined from the timer), the PM sensor current continues to stay below the threshold (plot 610) as indicated by plot 602. Hence, the PM sensor continues accumulating PMs until the end of the drive cycle, which occurs at t10. Thus, during the single drive cycle between t7 and t10, the PM sensor current stays below threshold, and no leak is detected, and the leak monitoring waits until the next drive cycle. At t11, the next drive cycle is indicated. Specifically, between t10 and t11, the engine is cooled to ambient temperature (plot 616) and there are no other ON/OFF cycles in between. The PM sensor current is monitored as described earlier during the next drive cycle (plot 606). Briefly, the PM sensor starts accumulating PMs once the exhaust temperature increases above threshold (at t12), and the PM sensor current is monitored as indicated by plot 602. Notably, the PM sensor current at t12 is the PM sensor current measured at t10 or the end of the previous drive cycle. As such, since the PM sensor current did not reach the threshold during the first drive cycle (plot 604), PM sensor was not regenerated, hence the PM sensor current starts at the value at the end of first drive cycle, for example. At time t14 or when a second duration has elapsed, the PM sensor current rises above the threshold, and a degradation of the DPF may be indicated. Thus, a second failure mode may be indicated. In this way, a slower leak detection may be performed and smaller leaks in the DPF may be detected. As such, the time required for the slower leak detection is dictated by the time required for the PM sensor to accumulate PMs to the threshold for a DPF leaking at the OBD threshold. This duration may span multiple drive cycles, as shown in plot 600. Indicating degradation of the DPF may include indicating a smaller leak in the DPF. Furthermore, a second diagnostic code (different from the first diagnostic code) may be set. In addition, the operator may be notified of the smaller leak in the DPF, and the engine power may be reduced to a second level (lower than the first level, for example).

Another leak detection is shown occurring through multiple drive cycles between t16 and t26. Herein, plurality of successive drive cycles are denoted by plots 604 (first drive cycle between t16 and t19), 606 (second drive cycle between t20 and t22), and 608 (third drive cycle between t23 and t26). During each of the drive cycle, the PM sensor starts accumulating PMs, once the exhaust temperature is higher than the threshold as described earlier (e.g., t17). At the end of the first duration (e.g, at t18), the PM sensor current is below the threshold. Hence the PM sensor current is monitored over the second drive cycle (plot 606) with engine cooled between the first and second drive cycle. During the second drive cycle (plot 606) between t20 and t22, exhaust reaches threshold temperature at t21. Thereafter, the PM sensor accumulates PMs, and the PM sensor current increases (plot 602). However, the end of the drive cycle is indicated at t22 (before the second duration has elapsed, for example). Hence the leak monitoring continues during the third drive cycle (plot 608), for example. Again, the engine is cooled to ambient temperature there between. Specifically, no other ON/OFF cycle occurs between the drive cycles (between t22 and t23, for example). During each of the first, second and third drive cycles, the PM sensor current continues to stay below threshold (610) as indicated by plot 602. At t25, when the second duration elapses, the PM sensor current continues to stay below the threshold, hence no leak is indicated. Thus, in response to the PM sensor current being less than the threshold current after the second duration has elapsed, a normative mode of the particulate filter may be indicated. In this way, a slower leak detection may be performed spanning multiple drive cycles. It may be appreciated that the number of drive cycles required for the completion of the slower leak detection (and possibly the faster leak detection also), depends on the duration of the drive cycle. If the vehicle is operated in short drive cycles, the leak monitoring may span multiple drives cycles. However, if the drive cycle is long, then both the slower and the faster leak detection may complete in a single drive cycle. Thus, large leaks are accurately detected using the faster leak detection, while the smaller leaks are detected over multiple drive cycles.

The systems described herein and with regard to FIG. 1 along with the methods described herein and with regard to FIGS. 3, 4 and 5 may enable one or more systems and one or more methods. An example method for detecting failure modes of a particulate filter is shown. The method may include regenerating a particulate matter (PM) sensor positioned downstream of the particulate filter, and accumulating particulate matter on the PM sensor until a particulate filter status has been indicated. In response to an electric current of the PM sensor being greater than a threshold current after a first duration has elapsed, the method may include indicating a first failure mode of the particulate filter. In response to the electric current of the PM sensor being greater than the threshold current after a second duration has elapsed, the method may include indicating a second failure mode of the particulate filter. Furthermore, in response to the electric current of the PM sensor being less than the threshold current after the second duration has elapsed, the method may include indicating a normative mode of the particulate filter. Herein, the first threshold duration may be less than a drive cycle duration, and the second threshold duration may be greater than the drive cycle duration, where the drive cycle duration may include duration within a vehicle-on and a vehicle-off with an engine-on in between. The first failure mode may further include one or more of indicating a larger leak in the particulate filter, setting a first diagnostic code, notifying an operator, and limiting engine output power to a first threshold or level. In addition, the second failure mode may include one or more of indicating a smaller leak in the particulate filter, setting a second diagnostic code, notifying the operator, and limiting engine output power to a second threshold or level. The first diagnostic code may be different from the second diagnostic code and the first duration may be smaller than the second duration. The method may further include regeneration of the PM sensor when a particulate matter load is greater than a load threshold, and terminating regeneration of the PM sensor when the particulate matter load is lower than the load threshold, and accumulating of PMs may include collecting of exhaust particulates on the PM sensor.

In another example, a system for a vehicle is provided, the system comprising an engine including an exhaust passage, a diesel particulate filter (DPF), and a particulate matter (PM) sensor coupled downstream of the DPF. A controller with computer-readable instructions stored on non-transitory memory, that when executed may be configured to indicate a leak in the DPF responsive to PM sensor regeneration conditions being met during one or more of drive cycles. The controller may be further configured to indicate no leak in the DPF responsive to PM sensor regeneration conditions not being met during each of the drive cycles. In such an example, responsive to PM sensor conditions being met, the controller may additionally or alternatively determine if DPF regeneration conditions are met prior to indicating the leak in the DPF. Responsive to DPF regeneration conditions being met, the controller may additionally or alternatively regenerate the DPF and the PM sensor. The controller may be configured to regenerate the DPF by increasing temperature of the DPF. In another representation, if the PM sensor regeneration conditions are still met, then the controller may be configured to indicate leak in the DPF. However, if the PM sensor regeneration conditions are not met, then the controller may be configured to indicate no leak in the DPF. However, if the DPF regeneration conditions are not met, the controller may be configured to indicate leak in the DPF. The controller may further be configured to indicate a larger leak in DPF responsive to PM sensor regeneration conditions being met in each of a first drive cycles, and successive drive cycles, and setting a first diagnostic code. The controller may further be configured to indicate a smaller leak in DPF responsive to PM sensor regeneration conditions being met in one of the first drive cycles and the successive drive cycles, and setting a second diagnostic code, wherein the second diagnostic code is different from the first diagnostic code. In this way, large and small leaks in the DPF may be detected.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
adjusting engine operation in response to a particulate matter (PM) sensor coupled downstream of a particulate filter in an engine exhaust; and
indicating degradation of the particulate filter in the engine exhaust in response to a PM sensor performance within a single drive cycle and over a plurality of drive cycles, wherein the PM sensor performance includes monitoring a PM sensor current;
indicating degradation further includes
indicating a large leak in the particulate filter when the PM sensor current rises above a current threshold during the single drive cycle and each of the plurality of drive cycles; and
reducing engine power to a first level.

2. The method of claim 1, wherein the drive cycle includes a single sequence of a vehicle-on, an engine-run and a vehicle-off; and the plurality of drive cycles includes successive drive cycles with one or more of an engine cooled to ambient temperatures there between and a threshold time elapsed there between.

3. The method of claim 1, wherein indicating degradation further includes indicating a small leak in the particulate filter when the PM sensor current stays below the current threshold for the single drive cycle, and a cumulative PM sensor current rises above the current threshold during one of the plurality of drive cycles and further includes reducing the engine power to a second level.

4. The method of claim 1, further comprising indicating no leak in the particulate filter when a PM sensor current stays below a current threshold over the single drive cycle and each of the plurality of drive cycles.

5. The method of claim 4, wherein the adjusting engine operation further includes regenerating the PM sensor when the PM sensor current rises above the current threshold.

6. A method for detecting failure modes of a particulate filter, comprising:
regenerating a particulate matter (PM) sensor positioned downstream of the particulate filter;
accumulating particulate matter on the PM sensor until a particulate filter status has been indicated;
in response to an electric current of the PM sensor being greater than a threshold current after a first duration has elapsed, indicating a first failure mode of the particulate filter;
in response to the electric current of the PM sensor being greater than the threshold current after a second duration has elapsed, indicating a second failure mode of the particulate filter; and
in response to the electric current of the PM sensor being less than the threshold current after the second duration has elapsed, indicating a normative mode of the particulate filter, wherein the first duration is smaller than the second duration.

7. The method of claim 6, wherein the first duration is less than a drive cycle duration, and the second duration is greater than the drive cycle duration; wherein the drive cycle duration includes duration within a vehicle-on and a vehicle-off with an engine-on in between.

8. The method of claim 6, wherein the first failure mode further comprising one or more of indicating a large leak in the particulate filter, setting a first diagnostic code, notifying an operator, and limiting engine output power to a first threshold.

9. The method of claim 8, wherein the second failure mode comprises one or more of indicating a small leak in the particulate filter, setting a second diagnostic code, notifying the operator, and limiting engine output power to a second threshold.

10. The method of claim 9, wherein the first diagnostic code is different from the second diagnostic code.

11. A method for detecting failure modes of a particulate filter, comprising:
regenerating a particulate matter (PM) sensor positioned downstream of the particulate filter;
accumulating particulate matter on the PM sensor until a particulate filter status has been indicated;
in response to an electric current of the PM sensor being greater than a threshold current after a first duration has elapsed, indicating a first failure mode of the particulate filter;
in response to the electric current of the PM sensor being greater than the threshold current after a second duration has elapsed, indicating a second failure mode of the particulate filter; and
in response to the electric current of the PM sensor being less than the threshold current after the second duration has elapsed, indicating a normative mode of the particulate filter, wherein regenerating includes regeneration of the PM sensor when a particulate matter load of the PM sensor is greater than a load threshold, and terminating regeneration of the PM sensor when the particulate matter load of the PM sensor is lower than the load threshold.

12. A system for a vehicle, comprising:
an engine including an exhaust passage;
a diesel particulate filter (DPF);
a particulate matter (PM) sensor coupled downstream of the DPF; and
a controller with computer-readable instructions stored on non-transitory memory for:
responsive to PM sensor regeneration conditions being met during one or more of drive cycles, indicating a leak in DPF;
responsive to PM sensor regeneration conditions not being met during each of the drive cycles, indicating no leak in DPF; and
indicating a large leak in DPF responsive to PM sensor regeneration conditions being met in each of a first drive cycle, and successive drive cycles, and setting a first diagnostic code.

13. The system of claim 12, wherein the controller includes further instructions for: determining if DPF regeneration conditions are met prior to indicating the leak in the DPF and responsive to DPF regeneration conditions being met, regenerating the DPF and indicating no leak in the DPF.

14. The system of claim 13, wherein the controller includes further instructions for: regenerating the DPF by increasing temperature of the DPF.

15. The system of claim 13, wherein the controller includes further instructions for: responsive to DPF regeneration conditions not being met, indicating leak in the DPF.

16. The system of claim 12, wherein the controller includes further instructions for: indicating a small leak in DPF responsive to PM sensor regeneration conditions being met in one of the successive drive cycles after the first drive cycle, and setting a second diagnostic code, wherein the second diagnostic code is different from the first diagnostic code.

* * * * *